United States Patent [19]

Van Putte et al.

[11] Patent Number: 4,960,544

[45] Date of Patent: Oct. 2, 1990

[54] FRACTIONATION OF FAT BLENDS

[75] Inventors: Karel P. Van Putte, Maasland; Johannes J. Muller, Rotterdam, both of Netherlands

[73] Assignee: Lever Brothers Company, New York, N.Y.

[21] Appl. No.: 496,066

[22] Filed: Mar. 16, 1990

Related U.S. Application Data

[63] Continuation of Ser. No. 395,170, Aug. 17, 1989, abandoned, which is a continuation of Ser. No. 57,073, Jun. 2, 1987, abandoned.

[30] Foreign Application Priority Data

Jun. 4, 1986 [GB] United Kingdom ............... 8613528
Nov. 3, 1986 [NL] Netherlands ..................... 8602775

[51] Int. Cl.$^5$ .............................................. C11C 3/00
[52] U.S. Cl. ................................ 260/420; 260/428; 426/601
[58] Field of Search ............... 260/420, 428; 426/601

[56] References Cited

U.S. PATENT DOCUMENTS

| 3,634,100 | 1/1972 | Fondu et al. | 99/122 |
| 3,956,522 | 5/1976 | Kattenberg et al. | 426/603 |
| 4,386,111 | 5/1983 | Van Heteren et al. | 426/603 |
| 4,388,339 | 6/1983 | Lomneth et al. | 426/602 |
| 4,486,457 | 12/1984 | Schijf et al. | 426/603 |

FOREIGN PATENT DOCUMENTS 1455416 11/1976 United Kingdom.

*Primary Examiner*—Werren B. Lone
*Assistant Examiner*—Vera C. Clarke
*Attorney, Agent, or Firm*—Rimma Mitelman

[57] ABSTRACT

A process for producing a hard fat, which involves fractionating a fat blend in a diluting liquid oil to obtain a stearin fraction rich in triglycerides from two long chain fatty acids and one medium chain fatty acid.

Use of the stearin fraction for the production of diet margarines.

17 Claims, No Drawings

FRACTIONATION OF FAT BLENDS

This is a continuation of Ser. No. 395,170, filed Aug. 17, 1989, now abandoned, which is a continuation of Ser. No. 057,073, filed on June 2, 1987, now abandoned.

The present invention relates to a process for the fractionation of fat blends. The present invention further relates to water- and oil-containing emulsions, and particularly margarines and reduced spreads of the W/O-type, having a high level of triglycerides from polyunsaturated fatty acids.

It is known to fractionate fat in the presence of an organic solvent such as acetone or hexane. Such fractionation procedure is highly efficient but expensive.

It is also known to fractionate fats by using an aqueous solution of a surface-active agent during the separation of olein and stearin fractions, according to the so-called Lanza process.

Another known fractionation process is the dry fractionation process which is carried out in the absence of the classical organic solvents. This method, although relatively cheap, is not suitable for fractionating fat blends which contain a considerable amount of crystallized fat at the temperature of separation, for instance at 20° C., since such fats are not pumpable and separation of the fractions is almost impossible owing to the rheological properties of the mass.

It is an object of the present invention to provide a cheap process for fractionating fats which contain at least 15%, and preferably more than 30%, crystallized fat at the temperature of separation, for instance at 20° C., in the absence of the classical organic solvents, but in the presence of a liquid oil as the diluting medium.

It is another object of the present invention to provide an efficient process for producing a stearin which can be used as a hardstock in producing edible emulsions. In this context, by an efficient process is meant a process leading to a separation efficiency exceeding 0.3, preferably between 0.4 and 0.8. By separation efficiency is meant the ratio of the amount of crystallized stearin formed at the temperature of separation (the amount of solids is measured by NMR) to the amount of separated stearin, i.e. stearin plus liquid oil and olein adhering thereto.

Finally, it is an object of the present invention to produce fat blends for edible emulsions such as margarines and low-fat spreads, which contain a high proportion of triglycerides from polyunsaturated fatty acids.

Applicants have developed a process which to a great extent meets the above desiderata.

The process of the present invention comprises in its most general form:

(a) producing a mixture comprising a fat blend and a liquid oil which is substantially free from crystallized fat at 10° C.;

(b) heating the mixture obtained to a temperature above the melting point;

(c) cooling the mixture in two stages, the first stage being performed at a relatively high cooling rate and the second stage being performed at a relatively slow cooling rate, while stirring under mild shear conditions to avoid settling of crystals and formation of fine crystals.

(d) separating the higher melting stearin fraction from a mixture of the lower melting olein fraction and liquid oil.

The fat blend subjected to fractionation preferably contains more than 20% and mostly between 30 and 90% crystallized fat at the temperature of separation, for instance at 20° C.

The fat blend may comprise a wide variety of fats with relatively high melting points, i.e. melting points which may vary from 30° to 71° C. In the present specification the term "melting point" refers to a temperature at least the slip melting point of the fat. For fats which exhibit gradual melting characteristics "melting point" should be interpreted as the temperature at which the fat becomes completely molten, that is the temperature at which the solids content of the fat is zero.

Such fats may comprise natural fats or fats which have been subjected to chemical treatments such as hydrogenation or interesterification.

The preferred starting fat blends for the purpose of the invention, i.e. production of highly efficient hardstocks which can be used in conjunction with high amounts of triglycerides from polyunsaturated fatty acids, contain triglycerides from two long chain, substantially saturated fatty acids (H) containing 16–24 C-atoms and one short chain fatty acid (M) containing 2–10 C-atoms less than the H fatty acids present in the triglyceride molecule, and preferably containing 12 or 14 carbon atoms.

Such fat blends can be produced by interesterification, preferably random interesterification, of a mixture of triglycerides wherein the ratio M:H ranges from 0.4 to 9.0 and preferably from 1 to 4.0.

Triglycerides of the $H_2M$-type are very efficient structural fats which can be used as a matrix in which liquid oils can be entrapped and do not display the detrimental effects with regard to waxiness displayed by triglycerides of the $H_3$-type Such $H_2M$ triglyceride-containing fats can be produced from (i) fats which comprise triglycerides containing M fatty acids, which are preferably the so-called laurics, i.e. coconut fat, palmkernel fat, ouricuri fat, babassu fat, tucum fat, murumuru fat, mixtures thereof and fractions thereof, which have been partly or fully hydrogenated, e.g. to a melting point between 30° and 41° C. and (ii) fats consisting of triglycerides from $C_{16}$–$C_{24}$ fatty acids which are substantially saturated, i.e. at least 90% of the fatty acids are saturated.

Such fats are for example obtained by hydrogenation of liquid oils, such as soybean oil, maize oil, groundnut oil, rapeseed oil, sunflower oil or palm oil, to achieve a melting point, e.g. ranging from 50°–71° C. Fats containing $H_2M$-triglycerides can be obtained from a mixture of the above fats (i) and (ii) by random interesterification in a way known per se, under moisture-free conditions, e.g. at 90°–140° C., in the presence of a catalyst such as an alkali hydroxide or an alkoxide.

It is also possible to produce the starting fat blends by straightforward esterification of glycerol with the appropriate fatty acids as described in EP 0089082 included herein by way of reference.

Starting fats containing triglycerides of the $H_2M$-type can also be obtained enzymatically by subjecting appropriate mixtures of triglycerides constituting a source of H and M fatty acids or mixtures of such triglycerides and appropriate fatty acids to enzymatic interesterification in the presence of lipase, in an organic solvent, e.g. at 5°–80° C. Suitable lipases are e.g. *Candida cylindricae-, Aspergillus niger-, Mucor Mihei-, Rhizopus-* or *thermomyces, Mucor Javanicus* lipase.

Hydrogenation of the triglycerides can be carried out before or after interesterification.

Preferred starting fats which are subjected to the fractionation procedure according to the invention are produced by dry fractionating palmkernel oil between 20° and 26° C. to obtain an olein and a stearin fraction, hydrogenating the olein to a melting point of 41° C. and randomly interesterifying 30-90 parts of said hydrogenated olein with 70-10 parts by weight of hydrogenated palm oil (melting point 58° C.), or hydrogenated rapeseed oil (melting point 70° C.) or hydrogenated sunflower oil (melting point 69° C.).

The starting fat blend to be fractionated is first mixed with a liquid oil, i.e. an oil or an olein which is substantially free from crystallized fat at 10° C., which preferably consists of sunflower oil, soybean oil, maize oil, grapeseed oil, rapeseed oil, safflower oil, peanut oil or any other oil which is rich in polyunsaturated fatty acids, wherein the ratio of the fat blend to the oil preferably ranges from 1:1 to 1:5, and ideally from 1:1 to 1:3. A smaller ratio is technically effective but expensive. Too high a ratio diminishes the efficiency of the fractionation.

The mixture of the fat blend and oil is first heated, preferably to 5°-25° C. above the melting point of the mixture. In most cases the temperature will be raised to 60°-80° C. The mixture is subsequently cooled in two stages as described above.

The quick cooling step is carried out down to a temperature close to the clear point and preferably down to 5°-10° C. above the clear point, which is defined as the temperature at which the mixture does not contain fat solids and is translucent. In most cases the quick cooling step (pre-cooling stage) will be carried out down to a temperature ranging from 30°-45° C., and preferably from 32° to 37° C.

The quick cooling step is carried out at a rate preferably exceeding 40° C./h, and ideally at a rate ranging from 200°-1000° C./h.

The slow cooling step is carried out at a rate generally not exceeding 5° C./h, preferably at a rate ranging from 0.5°-4° C./h, and ideally at a rate ranging from 0.6°-3° C./h.

The slow cooling step is carried out down to the temperature of separation, which varies depending on the triglyceride composition of the fat blend to be fractionated.

For the $H_2M$ triglycerides containing fat blends which constitute the preferred starting materials, fractionation is carried out at a temperature generally ranging from 15°-29° C., preferably from 16°-25° C., and ideally from 17°-23° C.

Cooling is carried out under low shear conditions to prevent settling of crystals and formation of fines, preferably continuously using a ribbon-type stirrer or intermittently using a gate stirrer.

Cooling, stirring and separation conditions and precautions taken as described above are such that a separation efficiency, as hereinbefore defined, preferably from 0.4-0.8, can be achieved.

A preferred way of separating the stearin from the olein fraction and liquid oil consists of using a membrane filter press.

According to a preferred embodiment of the present invention, the separated mixture of olein and liquid oil is recirculated by incorporating it in step (a) as a partial replacement of the diluting liquid oil. After a few cycles, the mixture of olein and oil consists of about 35% olein and 65% of the liquid oil. At this stage it is preferable to refresh the diluting medium for the fat to be fractionated by adding liquid oil.

Fractionation performed according to the process of the present invention, in the presence of a liquid oil rich in triglycerides from polyunsaturated fatty acids, is eminently suitable when the separated stearin is to be used as a hardstock for producing diet high pufa (polyunsaturated fatty acids) margarines and spreads in conjunction with substantial amounts of oils rich in polyunsaturated fatty acids.

The oil adhering to the separated stearin being essentially of the same or similar composition as the oil used for producing the margarine or spreads does no harm and need not be eliminated before using the hardstock.

Fat blends for margarines and spreads can be produced which contain 3-30% of the stearin fraction (this percentage corrected for liquid oil) as a hard-stock and 70-97% of a liquid oil, and preferably an oil rich in polyunsaturated fatty acids as hereinbefore described.

Water and oil-containing emulsions, particularly margarines and reduced fat (w/o emulsions) spreads containing a fat fraction, and particularly the stearin fraction obtained according to the fractionation process of the present invention, can be produced in a way known per se, e.g. as described in "Margarine" by Anderson & Williams, in a Yotator$^R$ equipment.

The invention will now be illustrated in the following Examples.

EXAMPLE 1

A mixture of (i) triglycerides obtained by random interesterification of a mixture of 30% hydrogenated palm oil (melting point 58° C.) and 70% of hydrogenated palmkernel olein (melting point 41° C.), which has been obtained by fractionating palmkernel fat in the absence of solvent at 23° C., separating the olein from the stearin and subsequently hydrogenating the olein:

(ii) sunflower oil (ratio randomized mixture to sunflower oil [by weight] 1:2), was charged in a 200 l vessel equipped with a ribbon-type stirrer.

The mixture was first heated to 70° C. and was subsequently cooled down to 40° C., applying a cooling rate of 60° C./h and continuously stirring at a rate of 7 rpm.

The pre-cooled mixture was subsequently cooled to 19° C., applying a cooling rate of 1° C./h, while gently stirring, avoiding settling of crystals, until a fat solids content in the slurry of about 15% (NMR measurement) is reached.

Separation of the stearin from the mixture of olein and sunflower oil was carried out, using a membrane filter press.

The separation efficiency after 30 minutes' pressing at 6 bar was about 0.54. The stearin was obtained in a yield of about 55% based on the interesterified mixture of triglycerides. (An illustration of the way of calculating this percentage is given at the end of this example.)

The stearin (this is the material consisting of pure stearin plus olein after separation of the liquid oil) was analyzed for its triglyceride composition. It contained 51.2% $H_2M$ triglycerides $C_{44}$-$C_{48}$) and 22.7% $H_3$ triglycerides (carbon number higher than 48).

Calculation of the stearin yield 33.33 kg interesterified mixture blended with 66.67 kg sunflower oil were subjected to fractionation. The separated stearin fraction weighed 29.1 kg. The composition of this separated stearin fraction was: 54% pure stearin, 9.4% olein and 36.6% sunflower oil.

The percentage of the separated stearin fraction corrected for sunflower oil is 63.4%. The yield in kg is 29.1×0.634=18.5 kg.

This yield based on the interesterified mixture is 18.5/33.33×100=55%.

EXAMPLE 2

Example 1 was repeated, with the exception that now the starting triglycerides used were obtained by random interesterification of a mixture of 30% hydrogenated sunflower oil (melting point 69° C.) and 70% of hydrogenated palmkernel olein (melting point 41° C.), which had been obtained by fractionating palmkernel fat in the absence of solvent at 23° C., separating the olein from the stearin and subsequently hydrogenating the olein.

The mixture was first heated to 70° C. and subsequently cooled down to 45° C., applying a cooling rate of 50° C./h under continuous stirring in a 200 l vessel.

The pre-cooled mixture was subsequently cooled to 19° C., applying a cooling rate of 1.2° C./h, while gently stirring, avoiding settling of crystals, until a solid phase content of the slurry of about 15% had been reached.

Separation of the stearin from the olein and sunflower oil was carried out, using a membrane filter press.

The separation efficiency after 30 minutes' pressing at 6 bar was 0.55. The stearin was obtained in a yield of 56.2% based on the interesterified mixture of triglycerides.

The stearin was analyzed for its triglyceride composition: $H_2M$ ($C_{44}$-$C_{48}$)=52.2%; $H_3$ (carbon number higher than 48)=18.7%.

EXAMPLE 3

The general procedure according to Example 2 was followed, using a 200 l vessel, with the exception that now the starting triglycerides used were obtained by random interesterification of a mixture of 30% hydrogenated rapeseed oil (melting point 70° C.) and 70% of hydrogenated palmkernel olein (melting point 41° C.), which had been obtained by fractionating palmkernel fat in the absence of solvent at 23° C., separating the olein from the stearin and subsequently hydrogenating the olein.

The separation efficiency after 30 minutes' pressing at 6 bar was 0.46. The stearin was obtained in a yield of 59.2% based on the starting mixture of triglycerides.

EXAMPLE 4

The general procedure of Example 1 was followed, with the exception that the mixture of randomly interesterified triglycerides and sunflower oil (weight ratio=1:2) was now charged into a 1 l vessel equipped with a gate-type stirrer, after having been pre-cooled from 70° C. to 35° C. by means of a plate heat exchanger.

The pre-cooled mixture was subsequently cooled to 19° C., applying a cooling rate of 2° C./h, while intermittently stirring at a ratio of 0.5 min. on/0.5 min. off, until a solid phase content of the slurry of about 14% had been reached.

Separation of the stearin from the olein and sunflower oil was now achieved by means of filtration on an overpressure test filter followed by hydraulic pressing of the filter cake on a laboratory scale press of the Fontyne-type.

The separation efficiency after 10 minutes' pressing at 12 bar was 0.50. The stearin was obtained in a yield of 51.9% on the interesterified mixture of triglycerides.

EXAMPLE 5

The general procedure of Example 4 was followed.

The pre-cooled mixture was subsequently cooled to 19° C. in a 9 tons crystallizer, applying a cooling rate of 1°.C./h, while intermittently stirring at a ratio of 0.5 min. on/0.5 min. off, until a solid phase content of the slurry of about 13% had been reached.

Separation of the stearin from the olein and sunflower oil was carried out, using a membrane filter press.

The separation efficiency after 2 hours' pressing at 6 bar was about 0.50. The stearin was obtained in a yield of 47.0% based on the interesterified mixture of triglycerides.

The stearin was analyzed for its $H_2M$ and $H_3$ triglyceride contents: $H_2M$ ($C_{44}$-$C_{48}$)=50.3% and $H_3$ (carbon number higher than 48)=23.5% were found.

EXAMPLE 6

The general procedure of Example 4 was followed, with the exception that the randomly interesterified triglycerides were now mixed with soybean oil (weight ratio 1:2).

After having been rapidly pre-cooled from 70° C. to 40° C. by means of a plate heat exchanger, the pre-cooled mixture was subsequently cooled to 19° C., applying a cooling rate of 1.5° C./h, while intermittently stirring at a ratio of 0.5 min. on/0.5 min. off, until a solid phase content of the slurry of about 14% had been reached.

Separation of the stearin was achieved according to Example 4.

The separation efficiency after 10 minutes' pressing at 12 bar was 0.51. The stearin was obtained in a yield of 55.4% based on the interesterified mixture of triglycerides.

The stearin was analyzed for its $H_2M$ and $H_3$ contents. These were: $H_2M$ ($C_{44}$-$C_{48}$)=49.7% and $H_3$ (carbon number higher than 48)=23.3%.

By pressing for 2 hours at 12 bar, the separation efficiency could be increased to 0.58.

The stearin was analyzed for its $H_2M$ and $H_3$ contents. These were: $H_2M$ ($C_{44}$-$C_{48}$)=50.7% and $H_3$ (carbon number higher than 48)=24.1%.

EXAMPLE 7

A margarine was produced from a fat blend consisting of 10% of the stearin obtained according to Example 1, and 90% sunflower oil.

A w/o emulsion was produced from 80% by weight of the fat blend and 20% by weight of an aqueous phase containing 1.75% salt, 0.1% K-sorbate, 0.03% flavour and about 17.12% reconstituted skimmilk (9.1% solids).

The emulsion was fed through a Votator ® to obtain a margarine having the following values expressed in g/cm², measured at the given temperatures $C_{5° C.}$=205 g/cm²
$C_{10° C.}$=160 g/cm²
$C_{15° C.}$=210 g/cm²
$C_{20° C.}$=145 g/cm²

EXAMPLE 8

A margarine was produced following the general procedure of Example 7 except that 10% of the stearin obtained according to Example 3 was used.

The margarines obtained displayed the following hardness values:

| | |
|---|---|
| $C_{5°C.} = 190$ g/cm$^2$ | $C_{15°C.} = 185$ g/cm$^2$ |
| $C_{10°C.} = 215$ g/cm$^2$ | $C_{20°C.} = 105$ g/cm$^2$ |

What is claimed is:

1. A process for fractionating a fat blend, which comprises
   (a) producing a mixture comprising a fat blend and a diluting liquid oil which is substantially free from crystallized fat at 10° C.;
   (b) heating the mixture obtained to a temperature above the melting point;
   (c) cooling the mixture in two stages, the first stage being performed at a relatively high cooling rate and the second stage being performed at a relatively slow cooling rate, while stirring under mild shear conditions to avoid settling of crystals and formation of fine crystals.
   (d) separating the higher melting stearin fraction from a mixture of the lower melting olein fraction and liquid oil.

2. A process according to claim 1, wherein the fat blend contains at least 15% crystallized fat at the fractionation temperature.

3. A process according to claim 1, wherein the diluting oil consists of sunflower oil, soybean oil, rapeseed oil, maize oil, grapeseed oil, safflower oil, peanut oil, or mixtures thereof.

4. A process according to claim 1, wherein the weight ratio of the fat blend to liquid oil ranges from 1:1 to 1:5.

5. A process according to claim 1, wherein in step (b) the mixture is heated to 5°-25° C. above its melting point.

6. A process according to claim 1, wherein the quick cooling step is carried out down to a temperature close to the clear point.

7. A process according to claim 6, wherein the quick cooling step is carried out at a rate exceeding 40° C./hour and the slow cooling step is carried out at a rate not exceeding 5° C./hour.

8. A process according to claim 1, wherein the mixture is quickly cooled from a temperature ranging from 60°-80° C. down to a temperature ranging from 30°-45° C. and the pre-cooled mixture is subsequently cooled slowly down to the fractionation temperature.

9. A process according to claim 8, wherein the fractionation temperature ranges from 15° to 29° C.

10. A process according to claim 1, wherein cooling is performed with continuous stirring, using a ribbon-type stirrer, or intermittently, using a gate stirrer.

11. A process according to claim 1, wherein the higher melting stearin fraction is separated from a mixture of the lower melting olein fraction and liquid oil with a separation efficiency ranging from 0.4–0.8.

12. A process according to claim 11, wherein separation of the stearin fraction from the mixture of olein fraction and liquid oil is carried out on a membrane filter press.

13. A process according to claim 1, wherein the separated mixture of olein fraction and liquid oil is recirculated by incorporating it in the mixture in step (a) as a partial replacement of the liquid oil.

14. A process according to claim 1, wherein the fat blend contains triglycerides from 2 long chain, substantially saturated fatty acids (H) containing 16-24 C-atoms and 1 shorter chain fatty acid (M) containing 2-10 C-atoms less than the present long chain fatty acids.

15. A process according to claim 14, wherein the fat blend is a mixture of triglycerides obtained by random interesterification of
   (i) a hydrogenated fat or a fraction thereof, selected from coconut, palmkernel, ouricuri, babassu, tucum and murumuru fat and
   (ii) a fat consisting of triglycerides from $C_{16-24}$ fatty acids, at least 90% of which being saturated, wherein the ratio of M to H fatty acids in the mixture of fat (i):fat (ii) ranges from 0.4–9.

16. A process according to claim 15, wherein fat (i) has a melting point ranging from 30° to 41° C. and fat (ii) has a melting point ranging from 50°-71° C.

17. A process according to claim 14, wherein the fat blend consists of the product of enzymatic interesterification of a source of long chain, substantially saturated fatty acids (H) containing 16-24 C-atoms and a source of shorter chain fatty acids (M) containing 2-10 C-atoms less than the fatty acids H, in the presence of lipase, wherein said sources of H and M fatty acids or the product of the enzymatic interesterification reaction are hydrogenated.

* * * * *